(12) United States Patent
Takahashi et al.

(10) Patent No.: US 7,252,435 B2
(45) Date of Patent: Aug. 7, 2007

(54) LINEAR MOTION GUIDE UNIT

(75) Inventors: Yoshitaka Takahashi, Osaka (JP);
Kazunori Hayashida, Osaka (JP);
Akihiko Kamimura, Kamakura (JP)

(73) Assignee: Nippon Thompson Co., Ltd., Tokyo (JP)

( * ) Notice: Subject to any disclaimer, the term of this patent is extended or adjusted under 35 U.S.C. 154(b) by 149 days.

(21) Appl. No.: 10/957,705

(22) Filed: Oct. 5, 2004

(65) Prior Publication Data
US 2005/0078892 A1    Apr. 14, 2005

(30) Foreign Application Priority Data
Oct. 8, 2003    (JP) .............................. 2003-349828

(51) Int. Cl.
*F16C 29/06* (2006.01)
(52) U.S. Cl. .......................................... 384/45; 384/13
(58) Field of Classification Search .................. 384/13, 384/43–45, 902
See application file for complete search history.

(56) References Cited

U.S. PATENT DOCUMENTS 3,027,626 A * 4/1962 Murphy ..................... 384/902
4,648,726 A * 3/1987 Katahira ....................... 384/45
5,707,718 A * 1/1998 Matsukawa et al. ........ 384/902
6,712,511 B2 * 3/2004 Matsui et al. ................. 384/45
6,854,351 B2 * 2/2005 Yabe et al. .................... 384/45

FOREIGN PATENT DOCUMENTS

JP    2001-82469    3/2001

* cited by examiner

*Primary Examiner*—Thomas R. Hannon
(74) *Attorney, Agent, or Firm*—Browdy and Neimark, PLLC (57) ABSTRACT

A linear motion guide unit is disclosed which makes it possible to a long-lasting steady application of lubricant and also makes sure of preventing effectively occurrence of particles of dirt. The linear motion guide unit is comprised of a guide member, more than one rolling element, and a slider supported for linear movement along the guide track rail by virtue of rolling elements, the slider being made therein with a fore-and-aft hole in which a sleeve fits to allow the rolling elements to roll through there. The sleeve is made of a cellular member impregnated with lubricant in vacuum atmosphere.

3 Claims, 4 Drawing Sheets

FIG. 4

LINEAR MOTION GUIDE UNIT

FIELD OF THE INVENTION

The present invention relates to a linear motion guide unit suitable for use in a diversity of industrial fields including semiconductor fabricating equipment, liquid crystal display manufacturing machines, and so forth, and more particular comprised of an elongated guide member and a slider fit over the guide member for linear movement relative to the guide member by virtue of more than one rolling element, which is allowed to roll through a recirculation circuit made in the slider.

BACKGROUND OF THE INVENTION

Most semiconductor fabricating machines has conventionally incorporated the linear motion guide units therein for handling or transfer requirements. The linear motion guide units are sometimes forced to work in high temperature and vacuum atmosphere, and usually comprised of more than one rolling element, a guide member made thereon a raceway groove to allow the rolling element to roll on through there, and a slider fit over the guide member for linear movement relative to the guide member by virtue of the rolling elements so that the slider together with any moveable part carried on the slider is allowed to move relatively to the guide member. With the linear motion guide units constructed as stated just earlier, the rolling elements constantly come into direct contact with both the guide member and the slider, and therefore better lubrication is needed to make certain of steady operation over a long-term service period.

The advanced linear motion guide units have recently become required to meet with needs of maintenance-free operation. The linear motion guide units especially working on the semiconductor fabricating machines in clean environment are strongly expected to be responsible for little or no dirt.

A linear motion guide unit to cope with the aspects as stated earlier is disclosed in, for example Japanese Patent Laid-Open No. 2001-82469, in which a sleeve fits in a lengthwise bore in the slider to provide a non-loaded return passage for the rolling elements, the sleeve being of cellular texture made by first sintering finely powdery ultrahigh molecular weight polyethylene and subsequently filling in cells or voids in the resulting sintered product with any lubricant through dipping process.

With the technical development applied to the linear motion guide unit as stated just earlier, or dipping approach to immerse the sleeve of cellular texture in lubricant, nevertheless, lubricant is prone to adhere to only any or both the inside and outside circular surface of the sleeve rather than filling enough in pores or cells in the cellular texture of the sleeve, thereby resulting in the provision of the sleeve that is insufficient in impregnation of lubricant. Using the imperfect sleeve as stated earlier in the linear motion guide unit especially working in vacuum environment would pose a difficult problem that the linear motion guide unit could not be ensured against little or no dirt and also better lubrication. Polyethylene to make the sleeve has another disadvantage of less in heat resistance.

SUMMARY OF THE INVENTION

The present invention is developed in light of the aspects as stated earlier, and has as its principal object the provision of a linear motion guide unit so constructed as to make sure of steady application of lubricant to any relative sliding areas over a long-lasting service period and also irresponsible for the occurrence of any dirt, with even better heat resistance.

The present invention is concerned with a linear motion guide unit; comprising more than one rolling element, a guide member made thereon with a raceway groove to allow the rolling element to roll through there, and a slider supported with the guide member for linear movement along the guide member by virtue of the rolling element, the slider being made therein with a passage in which a sleeve fits to allow the rolling element to roll through there; wherein the sleeve is made of a cellular member impregnated with lubricant in vacuum atmosphere.

In accordance with one aspect of the present invention, there is disclosed a linear motion guide unit in which the cellular member to prepare the sleeve has porosity in the range from 10 to 30%, and the lubricant fills in pores in the cellular member with an impregnation rate making up 90%-100% of the empty volume in the cellular member.

In accordance with another aspect of the present invention, there is disclosed a linear motion guide unit in which the cellular member to prepare the sleeve is preferably made of fluorine-contained polymer, so that the sleeve impregnated with fluorine-contained oil is high in heat-resisting property and also helps increase a long-lasting service life with less occurrence of dirt.

With the linear motion guide unit in which the sleeve of cellular member impregnated with lubricant in vacuum atmosphere fits in the passage as stated earlier, an adequate amount of lubricant held in the cellular member with the vacuum impregnation is allowed to ooze out of the sleeve to provide tiny lubricant to the rolling elements while they roll through sleeve. Ooze of lubricant out from the cellular member of the sleeve, moreover, is carried out with capillary action in the cellular member to help prevent too much application of lubricant, which might otherwise cause splashes of dirt particles of lubricant.

The present invention is further concerned with a linear; comprising more than one rolling element, a guide member made thereon with a raceway groove to allow the rolling element to roll through there, and a slider supported with the guide member for linear movement along the guide member by virtue of the rolling element, the slider being made therein with a passage in which a sleeve fits to allow the rolling element to roll through there; wherein the sleeve is made of a cellular member impregnated with lubricant; and wherein the cellular member to prepare the sleeve has porosity in the range from 10 to 30%, while the lubricant fills in pores in the cellular member with an impregnation rate making up 90%-100% of the empty volume in the cellular member.

With the linear motion guide unit in which the sleeve of cellular member having a desired porosity is impregnated with lubricant at a desired impregnation rate and then fit in the passage as stated earlier, an adequate amount of lubricant held in the cellular member is allowed to ooze out of the sleeve to provide tiny lubricant to the rolling elements while they roll through sleeve. Ooze of lubricant out from the cellular member of the sleeve, moreover, is carried out with capillary action in the cellular member to help prevent too much application of lubricant, which might otherwise cause splashes of dirt particles of lubricant. The sleeve lying in the fore-and-aft hole made in the slider has an advantage of a mechanical strength enough to allow the rolling elements to roll through there, even with keeping an adequate amount of lubricant impregnated therein.

In another aspect of the present invention, there is disclosed a linear motion guide unit in which a coating of fluorine-contained polymer with any functional group is preferably applied to at least any one of load-carrying surfaces of the rolling element, the guide member and the slider. With the construction as stated just earlier, the fluorine-contained polymer coating may also make for the application of lubricant, thus helping make certain of steady rolling motion of the rolling elements for a long-lasting service life where the rolling elements come into direct engagement with any of the guide member and the slider. The fluorine-contained polymer with any functional groups rich in adhesiveness with both the metallic material and the lubricant is preferred to provide the thin fluorine-contained polymer coating that is high in adhesiveness or bonding property to both the metallic material of the guide member and the lubricant applied to the rolling elements. This means that the fluorine-contained polymer coating with any functional groups rich in adhesiveness with both the metallic material and the lubricant has the advantage of curbing more effectively occurrence of lubricant dirt. Rolling elements while rolling through the circulation circuit, moreover, may serve to deliver the lubricant, which is impregnated in the cellular member, to the fluorine-contained polymer coating, thereby helping make sure of keeping steady rolling motion of the rolling elements for more long-lasting service life.

In another aspect of the present invention, there is disclosed a linear motion guide unit in which the lubricant has a vapor pressure not more than $10^{-9}$ torr at 20° C., which is beneficial to curbing any outgas.

In another aspect of the present invention, there is disclosed a linear motion guide unit in which the lubricant is fluorine-contained oil, which is beneficial to increasing the heat-resisting property.

With the linear motion guide unit in which the lubricant is fluorine-contained oil while the cellular member is made of fluorine-contained resin, the fluorine-contained oil can fill in pores or cells of the cellular member with high impregnation rate because of affinity for the fluorine-contained resin.

Moreover, the fluorine-contained oil has the advantage of rendering the linear motion guide unit more heat-resistant.

In a further another aspect of the present invention, there is disclosed a linear motion guide unit in which the coating of fluorine-contained polymer with any functional group is a gel coating, which is very tough to cause any abrasive wear or abrasives while the rolling elements come into rolling-contact with the surfaces of the counterparts because the coating does not get hard.

The linear motion guide unit constructed according to the present invention is effective in keeping steady application of lubricant to the rolling elements for a long-lasting service life and in curbing any occurrence of abrasives or particles of dirt.

DETAILED DESCRIPTION OF THE PREFERRED EMBODIMENTS

Referring now in detail to the drawings, the linear motion guide unit according to the present invention will be explained below.

The linear motion guide unit according to the present invention is intended to find applications in, for example any handling or transfer system of the semiconductor fabrication machines working in high temperature vacuum atmosphere, and comprised of a guide member 1, more than one rolling element or ball 2, and a slider 3 fitting over the guide member 1 for linear movement along the guide member 1 through the rolling elements 2.

The guide member 1 is constituted with an elongated member having a rectangular shape in transverse section, which is made of a metallic material covered by, for example Japanese Industrial Standard SUS 440 (=AISI 440A, 440B, S44020), SUS 440C (=AISI 440C), SUS 630 (=AISI S17400), SUS 304 (=AISI 304), and so on. "AISI" is short for "AMERICAN IRON AND STEEL INSTITUTE". The guide member 1 is made on widthwise opposing sides thereof with raceway grooves 1a extending lengthwise, one to each side.

Raceway grooves 1a cut into the guide member 1 are each made, for example, semicircular in transverse section to make it possible to keep the rolling elements 2 against falling away or escape out of the guide member 1 whenever the slider 3 moves linearly along the guide member 1 through the rolling elements 2.

The rolling elements or balls 2 are each made in a perfect sphere with accuracy, which is made of a metallic material covered by, for example Japanese Industrial Standard SUS 440, SUS 440C, SUS 630, SUS 304, and so on. With the linear motion guide unit of the present invention, the rolling elements 2 are all made substantially identical in size.

The slider 3 is made of a metallic material covered by, for example Japanese Industrial Standard SUS 440, SUS 440C, SUS 630, SUS 304, and so on. The slider 3 is comprised of a carriage 3a and end caps 3b mounted detachably to forward and aft ends of the carriage 3a, one to each end. The carriage 3a is formed to fit over or conform to the guide member 1 and therefore has wings lying on opposite sides of the guide member 1 in a way extending along the lengthwise sides of the guide member 1, one to each side. In the wings of the carriage 3a, there are each provided a lengthwise raceway groove lying in opposition to the raceway groove 1a on the guide member 1, and a fore-and-aft hole 3c for the provision of a return passage extending in parallel with the longitudinal direction of the guide member 1. A sleeve 21 fits in the associated fore-and-ft hole 3c to make sure of smooth rolling movement of the rolling elements 2 through there. Moreover, the end caps 3b are each made therein with a curved passage 3d to prepare a turnaround where the rolling elements 2 are allowed to transfer from the raceway groove 1a to the associated fore-and-aft hole 3c, and vice versa. The fore-and-aft hole 3c in the carriage 3a is made somewhat larger in diameter than the curved passage 3d to make it possible to fit the sleeve 21 in the fore-and-aft hole 3c, which allows the rolling elements 2 to run through smoothly in the return passage.

The sleeve 21 made apart from the carriage 3a to fit later in the fore-and-aft hole 3c in the carriage 3a has an outside circular surface of an outer diameter substantially identical with an inside diameter of the fore-and-aft hole 3c, and a lengthwise hole of an inside diameter almost as large as or somewhat larger than the diametric size of the rolling element or ball 2. Moreover, the sleeve 21, while should not be limited in shape and construction so long as it may fit into the fore-and-aft hole 3c in the carriage 3 and also it allows the rolling elements 2 to roll through there, is usually formed into a hollow cylinder of circular shape in transverse section. Thus, the rolling elements or balls 2 are installed in the slider 3 so as to roll through a circulation circuit made up of a load area defined between the raceway groove 1a on the guide member 1 and the raceway groove on the carriage 3a, the turnarounds 3d in the forward and aft end caps 3b and the return passage provided in the sleeve 21.

The sleeve 21 is composed of a porous or cellular member formed in, for example a hollow cylinder, and any lubricant filled in pores or cells in the cellular member. The sleeve 21 is designed to have porosity in the range of from 10% to 30%. The sleeve 21, when less in porosity than 10%, is too little in empty volume to keep a reserve of lubricant enough to make sure of better lubrication. By the way of contrast, when the porosity of the cellular member is beyond 30%, the sleeve 21 gets worse in mechanical strength and also much more in an amount of lubricant provided for the rolling elements 2 so that the likelihood of causing any dirt of excess lubricant would not be curbed certainly. It is thus preferred that the porosity of the cellular member to form the sleeve 21 is determined in the range of from 10% to 30%.

The cellular member for the sleeve 21 is made to include pores or porosities, each of which has preferably a porosity size in diameter as small as a matter of several 10 μm, most preferably in the range from 30 to 70 μm. Lubricant is moreover metered to fill in the cellular member of the sleeve 21 with a filling rate or impregnation rate making up 90%-100% of the empty volume in the cellular member. Less filling rate of the lubricant could fail to continue a long-term, steady application of lubricant onto the rolling elements 2.

The cellular member for the sleeve 21 is any hollow porous product that may be molded with extrusion of molding composition, which is composed of for example any synthetic resin and conventional pore-forming agent. Among the synthetic resins available for the cellular member in the present invention are fluorine-contained resins including tetrafluoroethylene polymers or the like, polyethylene, polypropylene, and so forth. Especially, the cellular member fabricated with fluorine-contained resin is most advantageous because of high heat-resisting property, which will stand up to for example 260° C. With the cellular member fabricated with the synthetic resins stated earlier, moreover, particles of dirt or debris caused from the cellular member due to abrasive engagement with the rolling elements 2 adhere easily to the rolling elements 2, thereby behaving beneficially in a manner that protects the linear motion guide unit against any lubricant starvation in the cellular member. As an alternative, the cellular member for the sleeve 21 may be produced by, for example, first compacting finely powdery ultrahigh molecular weight synthetic resin in any cavity mold made to the required shape, and subsequently sintering at elevated temperature the resulting compact to thereby prepare the sintered resinous member having porous or cellular texture. Nevertheless, the extruded cellular member stated earlier is superior in mechanical strength, compared with the sintered resinous member with pores. Thus, the cellular member produced with extrusion of the molding composition as stated earlier is considered to be more preferable for the sleeve 21 than the sintered cellular member.

As for the lubricant suitable for filling in pores in the cellular member for the sleeve 21, fluorine-contained oil is selected which has kinematic viscosity ranging from 500 to 1000 cSt at 20° C., and vapor pressure not more than $10^{-9}$ torr, preferably ranging from $10^{-12}$ to $10^{-9}$ at 20° C. The fluorine-contained oil, as having high heat-stable property endurable for example 300° C. and also chemical-stable property, is enough to qualify for the linear motion guide unit that is required to work well in high-temperature atmosphere.

The lubricant having vapor pressure over $10^{-9}$ torr at 20° C., as would vaporize readily out of the cellular member, raises a question of possible failure to continue a long-term, steady operation of the linear motion guide unit. In case where the lubricant is less than 500 cSt at 20° C. in kinematic viscosity, no coating of liquid or oil forms over the rolling elements 2 and the liquid or oil coatings, if any, are hard to last for a prolonged period of operation. This means that the lubricant sprays readily into the atmosphere or disperses in the form of tiny particles, which could cause any dirt or debris in the atmosphere. In contrast, when the lubricant is over 1000 cSt at 20° C. in kinematic viscosity, it gets harder to apply any adequate amount of lubricant to the rolling elements 2 to make certain of better lubrication.

Impregnation of the sleeve 21 with lubricant is preferably conducted in vacuum atmosphere. In detail, the cellular member for the sleeve 21 is introduced into a vacuum impregnation system where the cellular member is impregnated with lubricant under reduced pressure. As an alternative, the cellular member bathes in lubricant, followed by experiencing decompression just as it is. Selection of the vacuum impregnation is dictated by its advantage of increasing easily a rate of impregnation of the cellular member with lubricant. Although the conditions to carry out effectively the vacuum impregnation of the cellular member for the sleeve 21 with lubricant can be determined depending on many factors including porosity, different types of lubricant, and so forth, it is preferable for the vacuum impregnation to find such conditions that the lubricant could fill in every pore or cell in the cellular member.

Figure 1:
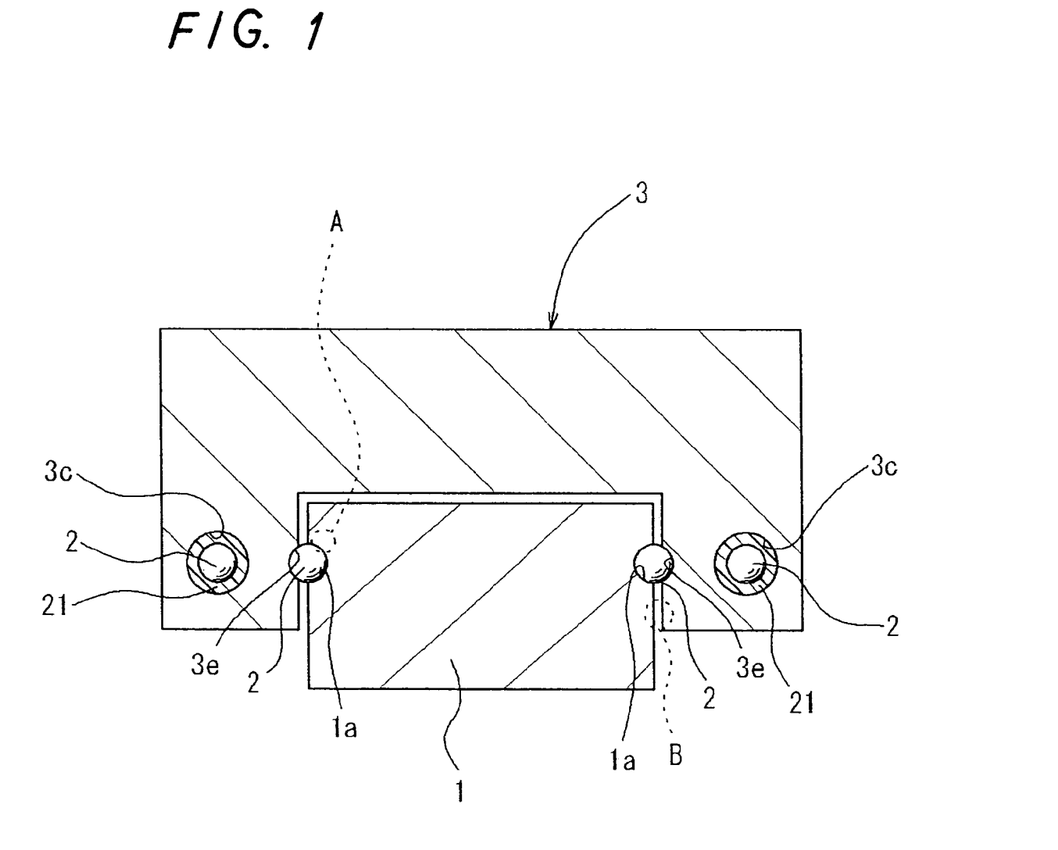
FIG. 1 is a traverse cross section of a preferred embodiment of a linear motion guide unit according to the present invention.
Figure 2:
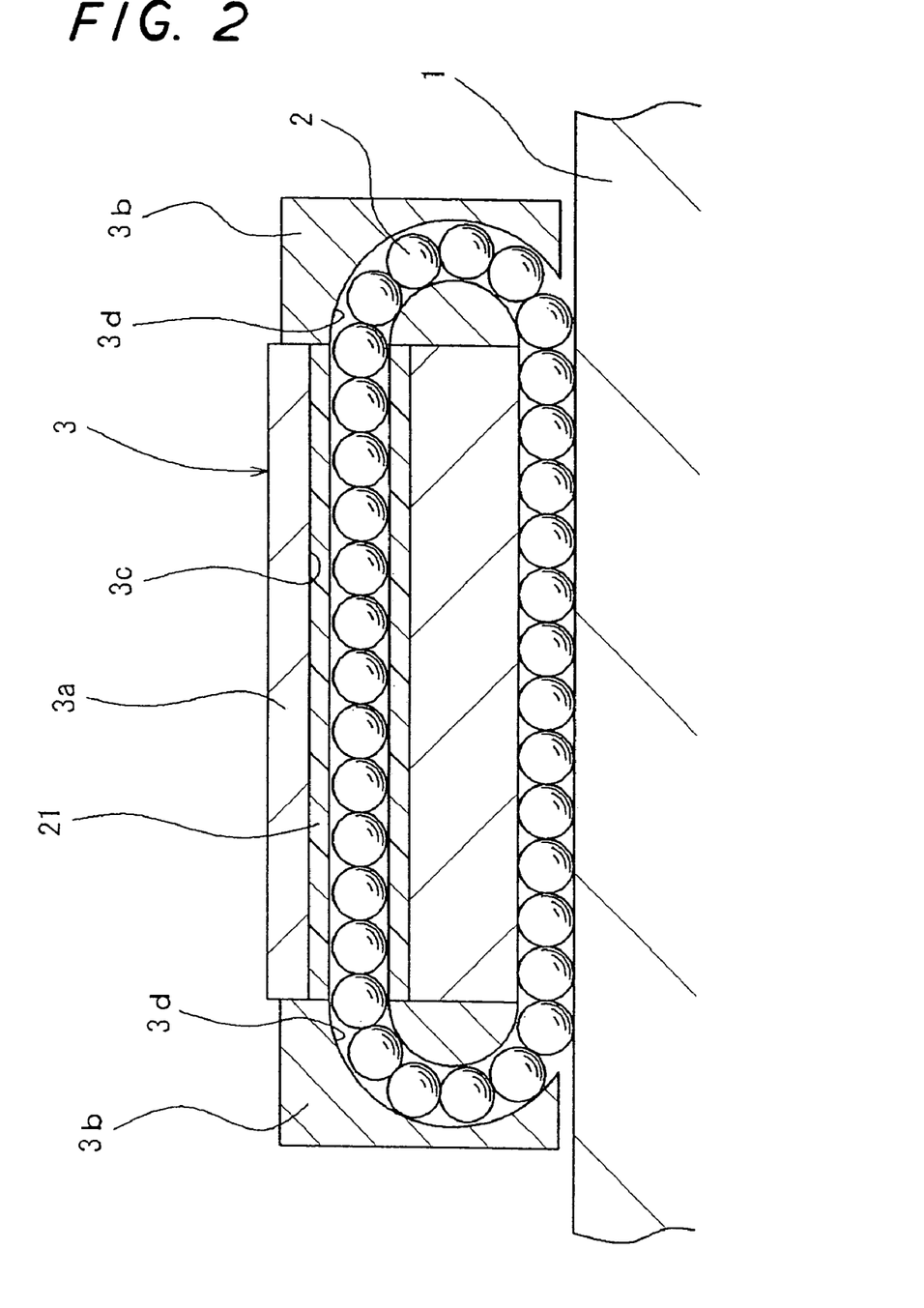
FIG. 2 is a fragmentary longitudinal section showing how more than one rolling element rolls through a recirculation circuit in the linear motion guide unit of FIG. 1.
Figure 3:
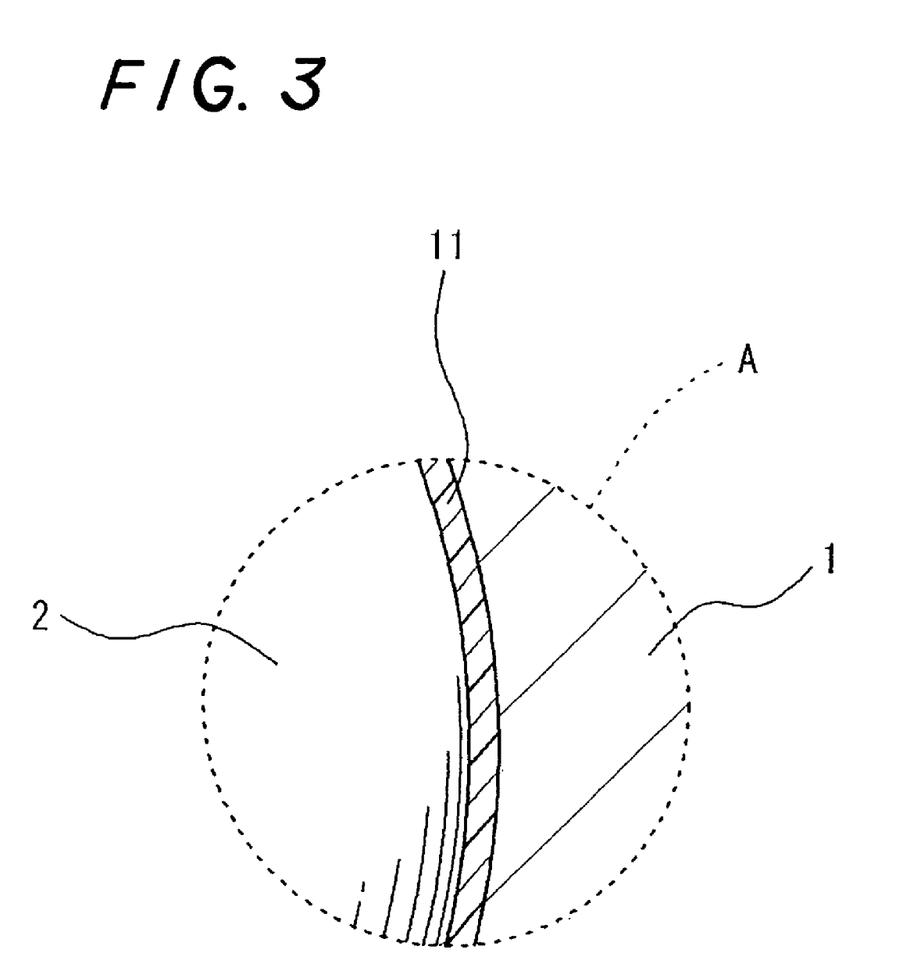
FIG. 3 is a fragmentary enlarged view in section of an area defined with dotted circle A in FIG. 1.
Figure 4:
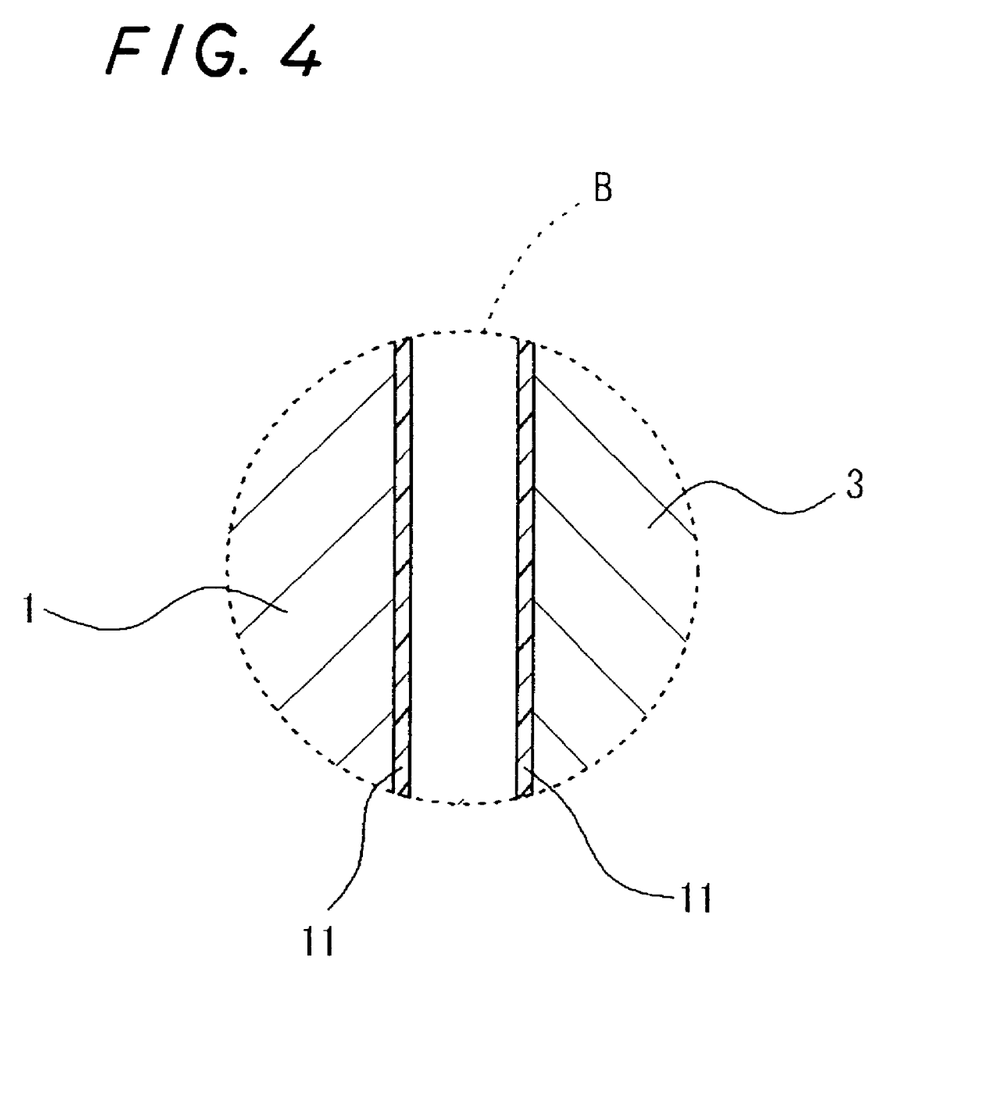
FIG. 4 is a fragmentary enlarged view in section of another area defined with dotted circle B in FIG. 1.

With the linear motion guide unit having incorporated therein the sleeve 21 constructed as stated earlier, both the guide member 1 and the slider 3 become applied throughout the overall surfaces thereof with very thin coatings of fluorine-contained polymer having functional groups. In detail, as shown in FIGS. 3 and 4, the coatings 11 with thickness of the order of submicron of fluorine-contained polymer having functional groups spread over the overall surface of the guide member 1 inclusive of the surfaces of the raceway grooves 1a cut in the guide member 1, that is, the surfaces coming into rolling contact with the rolling elements 2, and also the overall surface of the slider 3 including the surfaces of the end caps 3b and the surfaces 3e of the raceway grooves cut in the carriage 3a in opposition to the raceway grooves 1a, that is, the surfaces coming into rolling contact with the rolling elements 2.

The thin coating 11 of fluorine-contained polymer is a thin gel film of three-dimensional network structure, which is extremely low in frictional resistance and has fluidity enough to occur few fine dust particles due to abrasive wear that might caused by rolling motion of the balls 2. The thin coating 11 of fluorine-contained polymer as stated above is made using any one or more than two of compounds having some fluorine atoms, for example, fluoropolyether compound, poly-fluoroalkyl compound, and so on. The fluoropolyether compound is a compound having a structural unit represented by $—C_xF_{2x}—O—$ (X is an integer of from 1 to 4), and number average molecular weight (M) in the range from about 1,000 to about 50,000. Moreover, the poly-fluoroalkyl compound is a compound having a fluoro (–) alkyl group in which some hydrogen atoms in alkyl group are replaced with fluorine atoms, and number average molecular weight (M) in the range from about 1,000 to about 50,000.

The compounds having some fluorine atoms such as fluoropolyether compound, poly-fluoroalkyl compound, and so on are preferred to have any one or more than two of functional groups rich in adhesiveness with both the lubricant recited earlier and the metallic material constituting the guide member 1 and the slider 3. Among the functional groups having the property stated earlier are alcohol group, epoxy group, amino group, carboxyl group, hydroxyl group, mercapto group, isocyanate group, sulfo group, ester group, and so forth.

Among the preferable fluoropolyether compounds are compounds represented by the following formulae (a1)~(a10):

[Chemical Formula No. 1]

[in the formulae (a1)~(a10), m,n are each an integer]

Moreover, the preferable poly-fluoroalkyl compounds are compounds corresponding to the following formulae (b1)~(b13):

[Chemical Formula No. 2]

More particularly, it is preferred to use FONBLIN Y-standard, FOBLIN emulsion (FE20, EM04, etc.), FOBLIN Z-derivatives (FOBLIN Z DEAL, FOBLIN Z DIAC, FOBLIN Z DISOC, FOBLIN Z DOL, FOBLIN Z DOLTX2000, FOBLIN Z TETRAOL, etc.), which are all produced by Sociea Montecatini, Italy. These compounds preferably have the kinematic viscosity in the range from 1000 to 2200 cSt at 20° C.

The thin coating 11 of fluorine-contained polymer is formed with the procedure stated later. A coating solution is first prepared in which a compound having some fluorine atoms is dispersed into a solvent. The coating solution is kept low in concentration below 10 weight %, preferably in the range from 5 to 10 weight %. The guide member 1 and the slider 3 are bathed in the resulting coating solution, with made several turns so that the coating solution is applied to form coating skins over the surfaces of both the guide member 1 and the slider 3. As an alternative, the coating solution can be applied with spraying and so forth other than the bathing as stated earlier to make the coating skins on the surfaces of the metallic members.

When hoping to apply the coating solution on just a specific area of the metallic member, just any masking is sufficient to protect the specific area not to be coated prior to bathing or spraying. As an alternative, the coating skin may be formed on only any specific desired area with using, for example an injector to apply minute traces of coating solution. The coating solution applied on the guide member 1 and the slider 3 with any way stated earlier is heated, for example at 40-50° C. for 3 minutes to remove solvent in the coating solution and subsequently heated again, for example 80-180° C. for 15-70 minutes to eventually make the thin coating 11 of fluorine-contained polymer with thickness of the order of submicron, preferably in the range from 0.1 to 0.4 μm, for instance 0.2 μm. The thin coating 11 with any desired thickness will be made by carrying out repeatedly for desired times the procedures as stated earlier.

With the linear motion guide unit of the present invention, the sleeve 21 fit in the fore-and-aft hole 3c for the provision of the return passage to allow the rolling elements 2 to roll through there is made of the cellular member having the porosity in the range from 1-to 30%, which is impregnated with lubricant to have the rate of impregnation as high as the range from 90 to 100% by virtue of vacuum impregnation. Lubricant is allowed to ooze out of the sleeve 21 by capillary action in the cellular member to provide tiny lubricant to the rolling elements 2 while they roll through sleeve 2. Moreover, the cellular member for the sleeve 21, as affording to keep much reserve of lubricant, is effective to curb the phenomenon that excess lubricant splashes to cause any particles of dirt.

With the linear motion guide unit of the present invention, moreover, the lubricant is also provided from the thin coatings 11 of fluorine-contained polymer with functional groups, which are formed over the surfaces of both the raceway groove 1a on the guide member 1 and another raceway groove cut on the carriage 3a in opposition the former. This helps make sure of steady rolling operation of the rolling elements 2 for a long-lasting service period. The fluorine-contained polymer with any functional groups rich in adhesiveness with metallic material is preferred to provide the thin coating 11 that is high in adhesiveness or bonding property to the metallic material of the guide member 1. This means that the fluorine-contained polymer with any functional groups rich in adhesiveness with metallic material has the advantage of providing the thin coating 11 tough to become peeled away from the guide member 1. The fluorine-contained polymer coatings 11, moreover, have any functional groups rich in adhesiveness or bonding property to the lubricant impregnated in the sleeve 21. This means that the functional groups exposed outside serve to trap any splashed particles of lubricant, curbing effectively occurrence of lubricant dirt.

The rolling elements 2, while rolling through the sleeve 21, help provide the lubricant impregnated in the sleeve 21 onto the fluorine-contained polymer coatings 11 to thereby make it possible to ensure more long-lasting, steady rolling motion of the rolling elements 2. When fluorine-contained oil is impregnated in the cellular member of fluorine-contained resin, the fluorine-contained oil can fill in pores or cells of the cellular member with high impregnation rate because of familiar with the fluorine-contained resin. Moreover, the fluorine-contained oil has the advantage of high heat-resistance tolerable to a high temperature of, for example beyond 200° C.

With the linear motion guide unit constructed as stated earlier, both the guide member 1 and the slider 3 are entirely coated with the fluorine-contained polymer coatings 11, inclusive of any surface areas where the guide member 1 and the slider 3 while they move relatively to one another might come into direct engagement with each other, thereby causing any abrasives. This construction helps prevent effectively any abrasive wear and abrasive dirt, which would otherwise arise from any direct engagement between moving members rather than rolling contact with the rolling elements 2.

As the linear motion guide unit of the present invention may be embodied in several versions without departing from the essential characteristics thereof, the present embodiments are therefore illustrative and not restrictive. For example, the sleeve 21 may be made in a way divided into more than two parts, which are fit in the fore-and-aft hole 3c in the carriage 3a to make the complete sleeve 21 therein. Moreover, the fluorine-contained polymer coatings 11 with any functional groups may be made on the rolling elements 2. It will also be obvious to those skilled in the art that the linear motion guide unit of the present invention can be used for diverse fields other than any handling or transfer system of the semiconductor fabrication machines working in high temperature vacuum atmosphere.

What is claimed is:

1. A linear motion guide unit;

comprising a plurality of rolling elements, a guide member having a raceway groove for the rolling elements to roll through, and a slider supported with the guide member for linear movement along the guide member by virtue of the rolling elements, the slider being made with a passage in which a sleeve is engaged that facilitates rolling of the rolling elements therethrough;

wherein the sleeve is composed of a unsintered cellular member vacuum-impregnated with lubricant in a vacuum atmosphere, wherein a coating of fluorine polymer with any functional group is applied to at least load-carrying surfaces of the guide member and the slider, wherein the coating of fluorine polymer with any functional group is a thin gel film with thickness of the order of submicron, wherein the lubricant is fluorine oil, wherein the sleeve composed of the unsintered cellular member has pores therein, which are molded by extrusion of a molding composition of fluorine resin and a pore-forming agent when the cellular member is formed with fluorine resin, wherein the sleeve has porosity in the range from 10 to 30%, and the lubricant fills in pores in the cellular member with a rate of impregnation making up 90%-100% of the empty volume in the cellular member, and wherein the lubricant has a vapor pressure not more than $10^{-9}$ torr at 20° C.;

whereby the rolling elements are applied with minute traces of fluorine oil during rolling through inside the sleeve, and every time the rolling elements roll through the raceway grooves on the guide member, the minute traces of fluorine oil around the rolling elements transfer to the thin gel film of fluorine polymer having the functional group to help sustain the thin gel film of fluorine polymer for a long-lasting service period.

2. A linear motion guide unit; comprising a plurality of rolling elements, a guide member having a raceway groove for the rolling elements to roll through, and a slider supported with the guide member for linear movement along the guide member by virtue of the rolling elements, the slider being made with a passage in which a sleeve is engaged that facilitates rolling of the rolling elements therethrough;

wherein the sleeve is composed of a cellular member having pores with a diameter formed in an extension of a molding composition of unsintered fluorine resin and vacuum-impregnated with lubricant in a vacuum atmosphere, wherein a coating of fluorine polymer with any functional group is applied to at least load-carrying surfaces of the guide member and the slider, wherein the coating of fluorine polymer with any functional group is a thin gel film with thickness of the order of submicron, wherein the lubricant is fluorine oil, wherein the sleeve has porosity in the range from 10 to 30%, and the lubricant fills in the pores in the cellular member with a rate of impregnation making up 90%-100% of the empty volume in the cellular member, and wherein the lubricant has a vapor pressure not more than $10^{-9}$ torr at 20° C.;

whereby the rolling elements are applied with minute traces of fluorine oil during rolling through inside the sleeve, and every time the rolling elements roll through the raceway grooves on the guide member, the minute traces of fluorine oil around the rolling elements transfer to the thin gel film of fluorine polymer having the functional group to help sustain the thin gel film of fluorine polymer for a long-lasting service period.

3. The linear motion guide constructed as defined in claim 2, wherein the diameter of the pores is in the range of 30 to 70 μm.

* * * * *